(12) United States Patent
Modarres Razavi et al.

(10) Patent No.: US 12,363,672 B2
(45) Date of Patent: Jul. 15, 2025

(54) USER EQUIPMENT, NETWORK NODE AND METHODS IN A RADIO COMMUNICATIONS NETWORK

(71) Applicant: Telefonaktiebolaget LM Ericsson (publ), Stockholm (SE)

(72) Inventors: Sara Modarres Razavi, Stockholm (SE); Ritesh Shreevastav, Upplands Väsby (SE); Deep Shrestha, Linköping (SE); Iana Siomina, Täby (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 339 days.

(21) Appl. No.: 17/997,657

(22) PCT Filed: May 3, 2021

(86) PCT No.: PCT/SE2021/050408
§ 371 (c)(1),
(2) Date: Oct. 31, 2022

(87) PCT Pub. No.: WO2021/225499
PCT Pub. Date: Nov. 11, 2021

(65) Prior Publication Data
US 2023/0224849 A1    Jul. 13, 2023

Related U.S. Application Data

(60) Provisional application No. 63/021,159, filed on May 7, 2020.

(51) Int. Cl.
*H04W 64/00* (2009.01)
(52) U.S. Cl.
CPC .................................. *H04W 64/00* (2013.01)

(58) Field of Classification Search
CPC ...... H04W 88/02; H04W 88/08; H04W 88/18
See application file for complete search history.

(56) References Cited

U.S. PATENT DOCUMENTS

| 2009/0122812 | A1* | 5/2009 | Steiner ...................... H04L 7/10 370/503 |
| 2017/0272900 | A1 | 9/2017 | Do et al. |
| 2018/0139763 | A1 | 5/2018 | Bitra et al. |

FOREIGN PATENT DOCUMENTS

CN       110913327 A       3/2020

OTHER PUBLICATIONS

International Search Report and Written Opinion, Application No. PCT/SE2021/050408, Jul. 16, 2021, 13 pages.
(Continued)

*Primary Examiner* — Diane D Mizrahi
(74) *Attorney, Agent, or Firm* — Nicholson De Vos Webster & Elliott LLP

(57) ABSTRACT

A method performed by a User Equipment (UE) for determining an integrity level of an estimated position of the UE in a radio communications network. The UE obtains information from a network node operating in the radio communications network. The information is about service levels of positioning assistance information provided in the radio communications network. The service levels are related to any one or more out of Integrity (I), Availability (A), and Continuity (C). The UE further obtains positioning assistance information from the network node. The positioning assistance information relates to the established service levels. The UE then determines a positioning strategy based on the information about the service levels. The UE estimating the position of the UE according to the determined positioning strategy, and based on the obtained positioning (Continued)

X Unreliable, Imprecise
X Inaccurate, Invalid
X Inconsistant
X Low confidence level
X No integrity ✓ Reliable, Precise
X Inaccurate, Invalid
✓ Consistant
✓ High confidence level
X Lack of integrity X Unreliable, Imprecise
✓ Accurate, Valid
X Inconsistant
X Low confidence level
X Lack of integrity ✓ Reliable, Precise
✓ Accurate, Valid
✓ Consistant
✓ High confidence level
✓ High integrity assistance information, and determines an integrity level of the estimated position of the UE.

18 Claims, 15 Drawing Sheets

(56) References Cited

OTHER PUBLICATIONS

3GPP TS 22.261 V16.10.0, "third Generation Partnership Project; Technical Specification Group Services and System Aspects; Service requirements for the 5G system; Stage 1 (Release 16)," Dec. 2019, 72 pages, 3GPP Organizational Partners.
Qualcomm Incorporated, "New SID on NR Positioning Enhancements," Dec. 9-12, 2019, 3 pages, 3GPP TSG RAN Meeting #86, RP-193142, Sitges, Spain.
Qualcomm Incorporated, "New SID on NR Positioning Enhancements," Dec. 9-12, 2019, 4 pages, 3GPP TSG RAN Meeting #86, RP-193237, Sitges, Spain.

* cited by examiner

Fig. 2

(Target 1 - scattered shots)
X Unreliable, Imprecise
X Inaccurate, Invalid
X Inconsistent
X Low confidence level
X No integrity (Target 2 - tight cluster on bullseye edge)
✓ Reliable, Precise
X Inaccurate, Invalid
✓ Consistent
✓ High confidence level
X Lack of integrity (Target 3 - tight cluster near center)
X Unreliable, Imprecise
✓ Accurate, Valid
X Inconsistent
X Low confidence level
X Lack of integrity (Target 4 - tight cluster on bullseye)
✓ Reliable, Precise
✓ Accurate, Valid
✓ Consistent
✓ High confidence level
✓ High integrity 701. Receive a request from the target device or the radio network node on integrity, availability and continuity (I-A-C) service levels 702. Determine the (I-A-C) of the positioning assistance information based on environmental, network and service aspects 703. Send the (I-A-C) service levels to the target device via unicast or to the radio network node for broadcast signaling

Fig. 7

801. Receive a request from the target device on (I-A-C) service levels

802. Send a request to the location server on (I-A-C) service levels

803. Determine the (I-A-C) of the positioning assistance information based on environmental, network and service aspects 804. Send the (I-A-C) service levels to the target device via broadcast signaling

Fig. 8

901. Receive positioning request with integrity support from a network node or another unit.

902. Send a request for (I-A-C) service levels to the network node

903. Receive (I-A-C) service levels from the network node either via broadcast or unicast 904. Determine positioning solution strategy based on the received (I-A-C) service levels 905. Estimate the position based on the positioning solution picked in the strategy phase 906. Estimate the integrity level of the positioning estimation 907. Send the positioning estimation together with the integrity level to the network node or the other unit who sent the request

Fig. 9

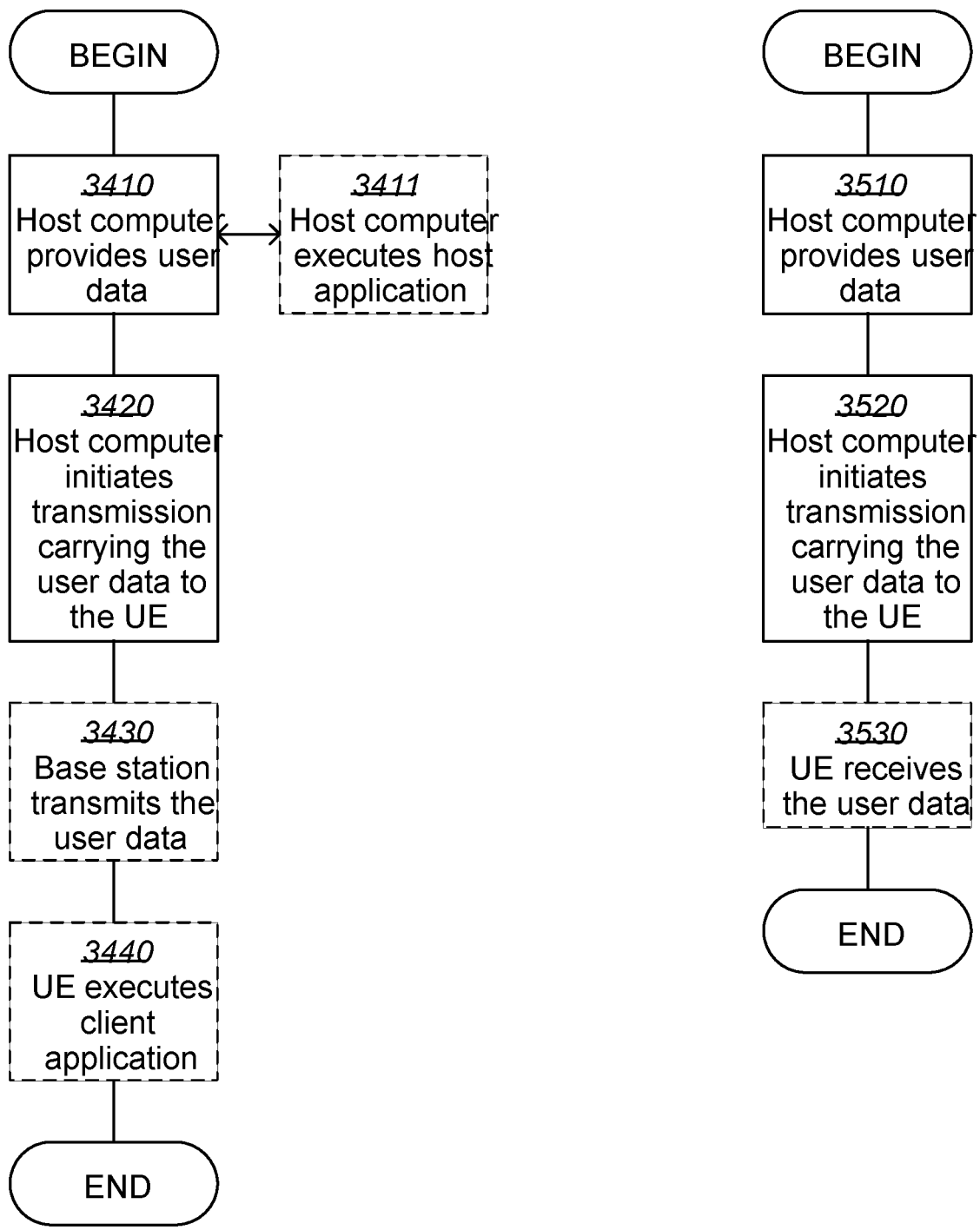

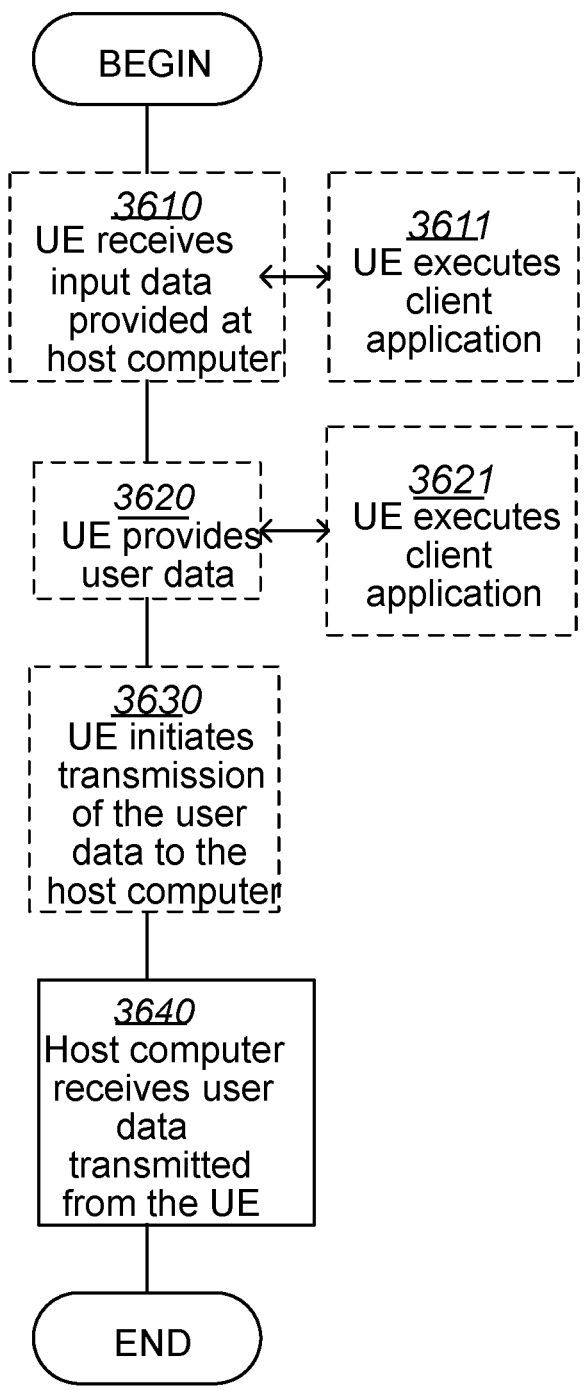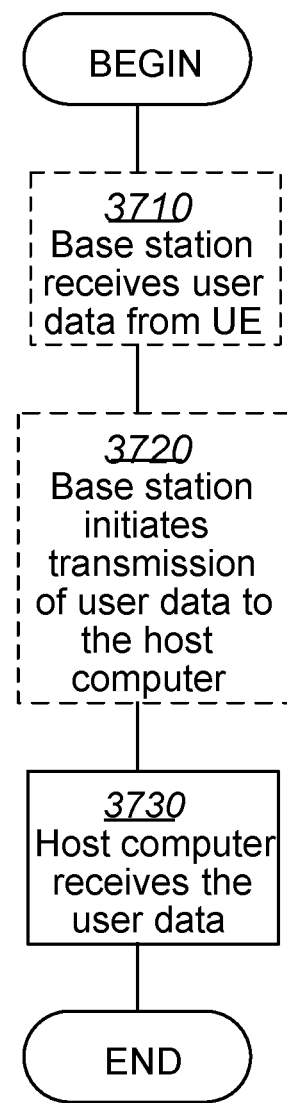
FIG 16
FIG 17

USER EQUIPMENT, NETWORK NODE AND METHODS IN A RADIO COMMUNICATIONS NETWORK

CROSS-REFERENCE TO RELATED APPLICATIONS

This application is a National stage of International Application No. PCT/SE2021/050408, filed May 3, 2021, which claims priority to U.S. Application No. 63/021,159, filed May 7, 2020, which are hereby incorporated by reference.

TECHNICAL FIELD

Embodiments herein relate to a UE, a network node and methods therein. In some aspects, they relate to determining an integrity level of an estimated position of the UE in the radio communications network.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio network node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Positioning has been a topic in LTE standardization since 3GPP Release 9. The primary objective is to fulfil regulatory requirements for emergency call positioning. Positioning in NR is proposed to be supported by an architecture shown in FIG. 1. The Location Management Function (LMF) node is the location node in NR. There are also interactions between the location node and the gNodeB via the NR Positioning Protocol A (NRPPa) protocol. The interactions between the gNodeB and the device are supported via the Radio Resource Control (RRC) protocol. FIG. 1 discloses an architecture according to 3GPP NG-RAN Release-15 LCS Protocols, wherein:

TP means Transmission Point.

SET means SUPL Enabled Terminal (SUPL Secure User Plane Location). This is wireless device or user equipment/terminal supporting SUPL.

LTE Uu is the radio interface that connects the UEs to the eNodeBs eNodeB with the UE. It handles all the signaling messages between the eNodeB and the MME as well as the data traffic between the UE and the S-GW NR Uu is the interface for cellular communication between device and base stations, similar to the definition for LTE now adopted for NR.

Xn is the interface defined between two NG-RAN nodes.

E-SMLC means Evolved Serving Mobile Location Centre.

AMF

NLs

Note 1: The gNB and ng-eNB may not always both be present.

Note 2: When both the gNB and ng-eNB are present, the NG-Core (C) interface is only present for one of them.

In the legacy LTE standards, the following techniques are supported:

Enhanced Cell ID. Essentially cell ID information to associate the device to the serving area of a serving cell, and then additional information to determine a finer granularity position.

Assisted Global Navigation Satellite System (GNSS). GNSS information retrieved by the device, supported by assistance information provided to the device from E-SMLC Observed Time Difference of Arrival (OTDOA). The device estimates the time difference of reference signals from different base stations and sends to the E-SMLC for multilateration.

Uplink Time Difference of Arrival (UTDOA). The device is requested to transmit a specific waveform that is detected by multiple location measurement units (e.g. an eNB) at known positions. These measurements are forwarded to E-SMLC for multilateration Sensor methods such as Biometric pressure sensor which provides vertical position of the device and Inertial Motion Unit (IMU) which provides displacement.

All of these methods are also being standardized for NR in 3GPP Release 15 (limited functionality) and Release 16 and planned to be enhanced in Release17.

The positioning modes may be categorized in below three areas:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own without network assistance.

Until now, accuracy has been the main positioning performance metrics which have been discussed and supported by the requirements in 3GPP. Emerging applications relying on high-precision positioning technology in autonomous applications, e.g., automotive, has brought with it the need for high integrity and reliability in addition to high accuracy. The 5G service requirements specified in 3GPP TS 22.261 include the need to determine the reliability, and the uncertainty or confidence level, of the position-related data.

Key Performance Indicators (KPI's) are indicators for if a device or equipment meets a certain reliability criteria for being ready for deployment.

In 3GPP RP-193237, a new Study Item (SI) on "New Study Item Description (SID) on NR Positioning Enhancements" has been approved in which one of the two objectives is to:

Study solutions necessary to support integrity and reliability of assistance data and position information: [RAN2]
  Identify positioning integrity (KPIs and relevant use cases.
  Identify the error sources, threat models, occurrence rates and failure modes requiring positioning integrity validation and reporting.
  Study methodologies for network-assisted and UE-assisted integrity.

Integrity

Integrity is the measure of trust that can be placed in the correctness of information supplied by a navigation and/or location system. For example, integrity includes the ability of a system to provide timely warnings to user receivers in case of a failure.

There are many aspects which may result to failure, for example:

Environmental aspects: local incidents such as fire or traffic accidents (including driverless cars) or extreme weather conditions, or large area impacts such as tsunami or earthquakes, etc.

Radio network aspects: Technical failure in location server, positioning signals transmission failure, availability and continuity failure of the service, etc.

Technical service aspects: Position calculation failure, measurement failure, failure in integrity KPIs, etc.

Example use cases and scenarios for positioning integrity: Any use-case related to positioning in Ultra Reliable Low Latency Communication (URLLC) naturally requires high integrity performance. Some example use-cases comprise Vehicle to everything (V2X), Autonomous Driving, UAV (drones), eHealth, rail and maritime, emergency and mission critical. In use-cases in which large errors can lead to serious consequences such as health-related impacts, wrong legal decisions or wrong charge computation, etc., the integrity reporting becomes crucial.

FIG. 2 illustrates a definition of accuracy, precision, validity, reliability and integrity. In FIG. 2 the middle of the circles illustrates the real position of a device, the surrounding circles illustrate distances from the real position of a device, and the crosses illustrate the positioning estimations from the positioning solution. Therefore, the figure shows how close or far the estimation positions are in relation to the real position of the device.

Basically, it may be concluded that accuracy is the same term as validity in positioning. Also, terms such as reliability, precision, uncertainty and confidence level may in some cases be used interchangeably. However, integrity requires the evaluation of both accuracy and reliability. FIG. 2 is further exemplifying the definition of accuracy, precision, validity, reliability, integrity, certainty.

Integrity KPIs and Events

There are below few example Integrity KPIs defined that may be of help in identifying different integrity events.

Alert Limit (AL): is the largest allowable error for safe operation.

Time to Alert (TTA): is the maximum allowable elapsed time from the onset of a positioning failure until the equipment announces the alert.

Integrity Risk (IR): is the probability of providing a signal that is out of tolerance without warning the user in a given period of time. The integrity risk is often assumed to include the Time to Alert, a sort of latency time left to the system before it detects a failure after it has occurred.

Protection Level (PL): is the statistical error bound computed to guarantee that the probability of the absolute position error exceeding the said number is smaller than or equal to the target integrity risk.

FIG. 3 shows an example with a Stanford plot in which all the possible integrity operation and events may be explained in its different regions.

Nominal Operation is when Position Error (PE)<Protection Level (PL)<Alert Limit (AL).
System unavailable is when AL<PL
Misleading Operation is when PL<PE
Hazardously Operation is when PL<AL<PE
Integrity Failure is an integrity event that lasts for longer than the TTA and with no alarm raised within the TTA.

Misleading Information (MI) is an integrity event occurring when, being the system declared available, the position error exceeds the protection level but not the alert limit.

Hazardously Misleading Information (HMI) is an integrity event occurring when, being the system declared available, the position error exceeds the alert limit.

Aside from integrity and accuracy, there are two more performance metrics, which may be considered for positioning service:

Continuity in time: The probability that the specified system performance will be maintained (no failure) for the duration (specific time interval) of a phase of operation, presuming that the system was available at the beginning of that phase of operation.

Continuity in space: e.g., within an area around the UE—can the same positioning service level/accuracy etc. be achieved in a closest surrounding area in case the UE is moving.

Availability: The percentage of time that the services of the system are usable by the navigator, which is an indication of the ability of the system to provide reliable information within the specified coverage area.

SUMMARY

As a part of developing embodiments herein the inventors identified a problem which first will be discussed.
UE Based Positioning Integrity Support In the current positioning support of LTE and NR systems, there is no functionality or signaling support in the network or UE for positioning integrity control. Further, the UE is not capable to assess its positioning estimation integrity. Different use cases require different level of integrity. No integrity support has been specified so far in 3GPP for RAT for positioning procedures and use cases.

An object of embodiments herein is to improve positioning in a wireless communications network.

According to an aspect of embodiments herein, the object is achieved by a method performed by performed by a User Equipment, UE, for determining an integrity level of an estimated position of the UE in a radio communications network. The UE obtains information from a network node operating in the radio communications network. The information is about service levels of positioning assistance information provided in the radio communications network. The service levels are related to any one or more out of Integrity, I, Availability, A, and Continuity, C, (I-A-C). The UE further obtains positioning assistance information from the network node. The positioning assistance information relates to the established service levels. The UE then determines a positioning strategy based on the information about the service levels. The UE estimating the position of the UE according to the determined positioning strategy, and based on the obtained positioning assistance information, and determines an integrity level of the estimated position of the UE.

According to another aspect of embodiments herein, the object is achieved by method performed by a network node for assisting a User Equipment, UE, in determining an integrity level of an estimated position of the UE in a radio communications network. The network node establishes service levels of positioning assistance information provided in the radio communications network. The service levels are related to any one or more out of Integrity, I, Availability, A, and Continuity, C, (I-A-C). The network node assists the UE in determining an integrity level of an estimated position of the UE by sending information to the UE, which information is about the established service levels of positioning assistance information, and sending to the UE, positioning assistance information relating to the established service levels. The UE is then enabled to determine a positioning strategy based on the information about the service levels, and estimate the position of the UE according to the determined positioning strategy, and based on the obtained positioning assistance information, and determine an integrity level of the estimated position of the UE.

According to an aspect of embodiments herein, the object is achieved by a method performed by a User Equipment, UE, configured to determine an integrity level of an estimated position of the UE in a radio communications network. The UE is further configured to:
Obtain information from a network node operating in the radio communications network, which information is adapted to be about service levels of positioning assistance information provided in the radio communications network, which service levels are adapted to be related to any one or more out of Integrity, I, Availability, A, and Continuity, C, (I-A-C),
obtain from the network node, positioning assistance information relating to the established service levels
determine a positioning strategy based on the information about the service levels,
estimate the position of the UE according to the determined positioning strategy, and based on the obtained positioning assistance information, and
determine an integrity level of the estimated position of the UE.

According to another aspect of embodiments herein, the object is achieved by a network node configured to assist a User Equipment, UE, in determining an integrity level of an estimated position of the UE in a radio communications network. The network node is further configured to:
establish service levels of positioning assistance information provided in the radio communications network, which service levels are adapted to be related to any one or more out of Integrity, I, Availability, A, and Continuity, C, (I-A-C),
assist the UE in determining an integrity level of an estimated position of the UE by sending information to the UE, which information is adapted to be about the established service levels of positioning assistance information, and sending to the UE, positioning assistance information relating to the established service levels, enabling the UE to determine a positioning strategy based on the information about the service levels, and estimate the position of the UE according to the determined positioning strategy and based on the obtained positioning assistance information, and determine an integrity level of the estimated position of the UE.

It is furthermore provided herein a computer program products comprising instructions, which, when executed on at least one processor, cause the at least one processor to carry out any of the methods above, as performed by any one or more out of the UE and the network node. It is additionally provided herein a computer-readable storage medium, having stored there on a computer program product comprising instructions which, when executed on at least one processor, cause the at least one processor to carry out the method according to any of the methods above, as performed by any one or more out of the UE and the network node.

Since the network node assist the UE in terms of established service levels of positioning assistance information related to any of I-A-C, the UE is enabled to determine an integrity level of the estimated position of the UE. This results in an improved vision of the quality of the positioning estimation in a wireless communications network, since there are some parameters which are known by the network in terms of the quality level of the positioning assistance information, and there are KPIs such as protection level that is mainly known at the UE side. By communicating the I-A-C level and integrity levels from both sides, there will be a better evaluation in terms of integrity and reliability of the positioning estimation.

BRIEF DESCRIPTION OF THE DRAWINGS

Examples of embodiments herein are described in more detail with reference to attached drawings in which:
FIG. 2 is a schematic block diagrams illustrating prior art.
FIG. 7 is a flowchart depicting embodiments of a method in a location server node.
FIG. 8 is a flowchart depicting embodiments of a method in a radio network node.
FIG. 9 is a flowchart depicting embodiments of a method in a UE.

FIGS. 14-17 are flowcharts illustrating methods implemented in a communication system including a host computer, a base station and a user equipment.

DETAILED DESCRIPTION

Embodiments herein provide support in determining integrity levels in UE based positioning methods.

Figure 1:
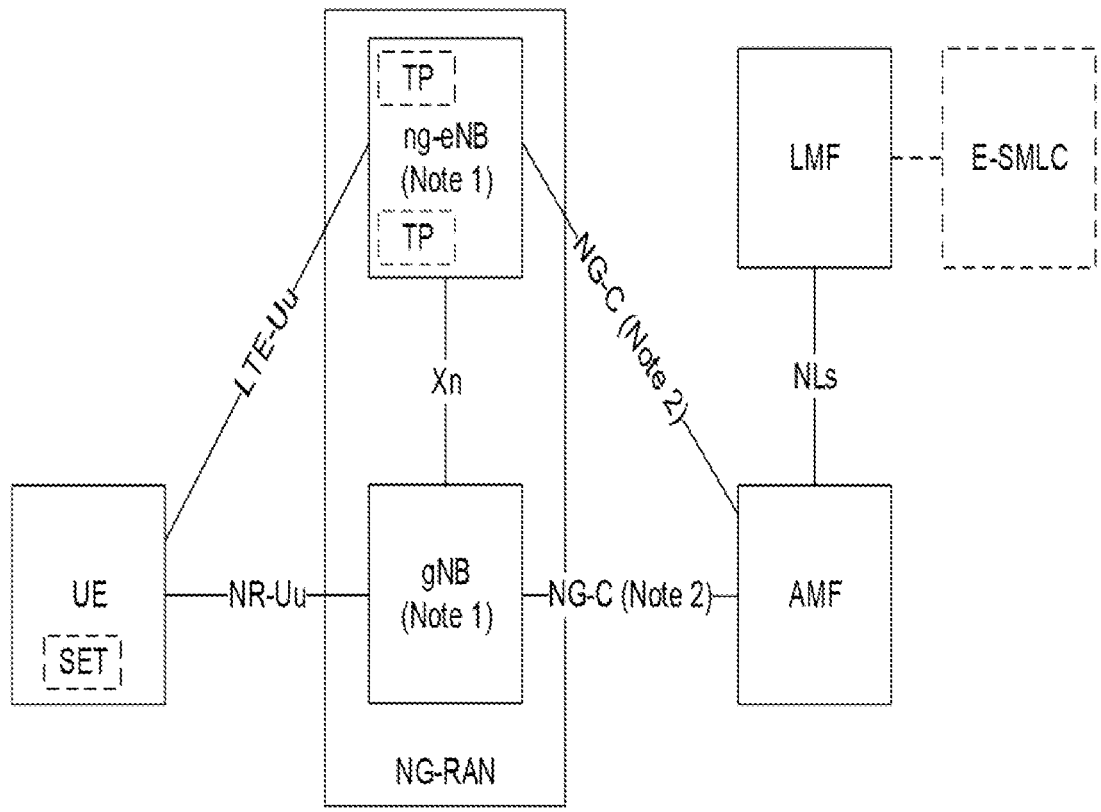
FIG. 1 is a schematic block diagrams illustrating prior art.
Figure 3:
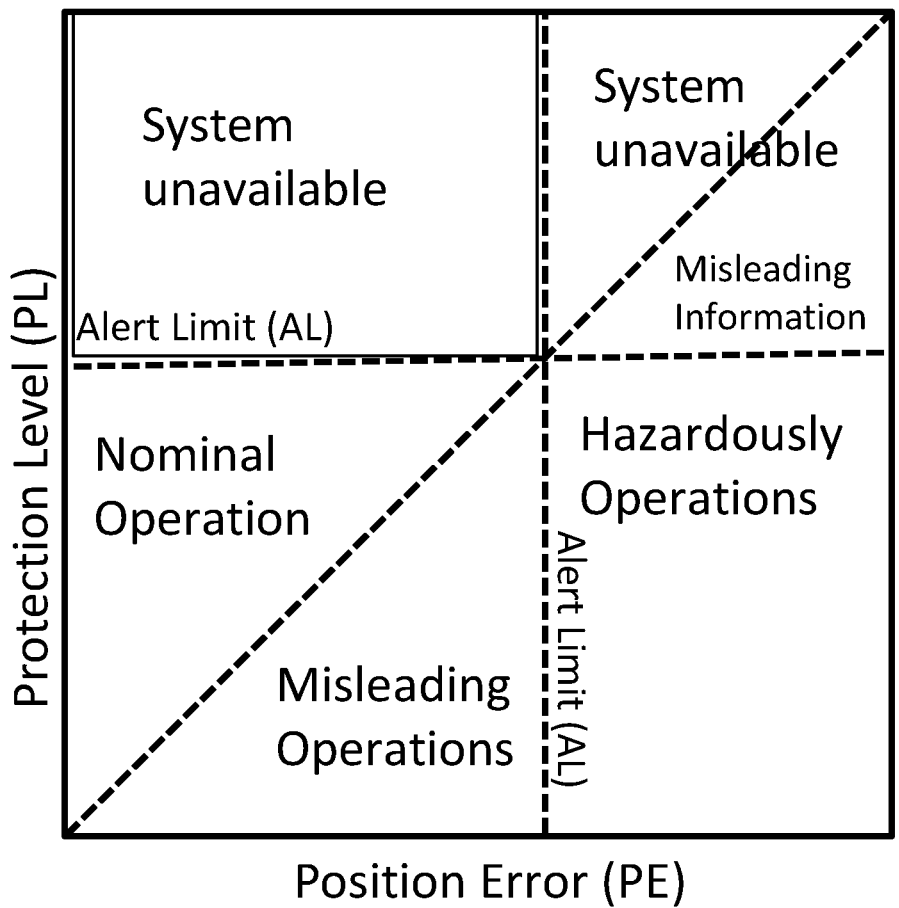
FIG. 3 is a schematic block diagrams illustrating prior art.
Figure 4:
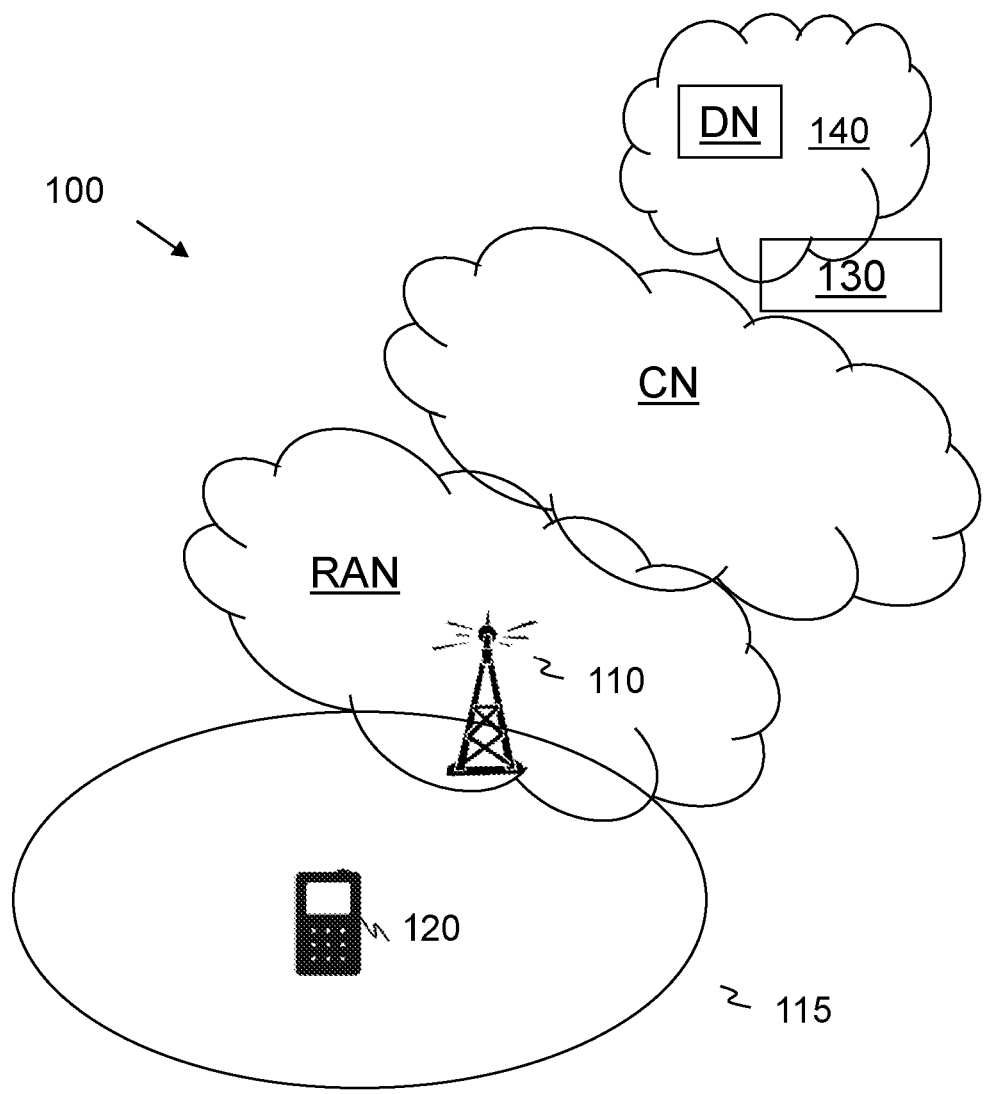
FIG. 4 is a schematic block diagram illustrating embodiments of a wireless communications network.

FIG. 4 is a schematic overview depicting a wireless communications network 100 wherein embodiments herein may be implemented. The wireless communications network 100 may also be referred to as a radio communications network 100, these two wordings may be used interchangeably herein. The wireless communications network 100 comprises one or more RANs and one or more CNs. The wireless communications network 100 may use 5G NR but may further use a number of other different technologies, such as, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes such as a radio network node 110 operate in the wireless communications network 100, by means of antenna beams, referred to as beams herein. The radio network node 110 e.g. provides a number of cells referred to as cell1 and cell2, and may use these cells for communicating with e.g. a UE 120. The radio network node 110 may be a transmission and reception point e.g. a radio network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by the radio network node 110 depending e.g. on the radio access technology and terminology used.

UEs operate in the wireless communications network 100, such as a UE 120. The UE 120 may e.g. be an NR device, a mobile station, a wireless terminal, an NB-IoT device, an eMTC device, an NR RedCap device, a CAT-M device, a WFi device, an LTE device and an a non-access point (non-AP) STA, a STA, that communicates via a base station such as e.g. the radio network node 110, one or more RANs, to one or more CNs. It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Network nodes such as a location server node 130 operate in the wireless communications network 100. The location server node 130 may e.g. also be referred to as a location server 130 herein. The location server node 130 may e.g. be an LMF.

Methods herein may in one aspect be performed by the radio network node 110, or the location server node 130, these are network nodes and are referred to as network node 110, 130 herein. The network node 110, 130 may e.g. be an LMF.

Methods herein may in another aspect by the UE 120. As an alternative, a Distributed Node (DN) and functionality, e.g. comprised in a cloud 140 as shown in FIG. 4, may be used for performing or partly performing the methods.

In embodiments proved herein e.g. a target device, e.g. the UE 120, has positioning integrity support capability and is able to assess assistance information received from the network node 110, 130, e.g., the positioning node 130 and/or radio network node 110 also referred to as BS. The positioning measurements is done at the device side, such as the UE 120, in order to determine the integrity level associated with the UE 120 positioning estimation. In some examples, the determined integrity level may be further used by the UE 120 for one or more operational tasks. The positioning estimation may be also computed at the target device, such as e.g. a normal 5G UE, e.g. the UE 120, or a vehicle with 5G capability or any other type of device which its position is being estimated . . . before and/or after or even together with the integrity level determination, or it may be estimated at a network node, such as e.g. the network node 110, 130.

In an example embodiment, the network node, such as e.g. the network node 110, 130, may receive requests for any one or more of performance metrics: Integrity, Availability and Continuity (I-A-C), while it may report, one, two or all of them depending on its capabilities and potentials.

The UE 120 may receive the (I-A-C) of the positioning assistance information from the location server 130 or from the radio network node 110 via unicast or in the latter case via broadcast or multicast. In this case, the (I-A-C) service levels may be computed in the location server 130, or in the radio network node 110 or partly within both network nodes 110, 130 and communicated among each other.

Examples of embodiments herein may be related to Positioning, Accuracy, Reliability, Integrity, and Integrity Risk.

Some embodiments herein provide methods for the UE to support positioning integrity e.g. comprising e.g.:

The network such as a network node 110 may assist the UE 120 in terms of different environmental, network and service failures which lead to unreliable position estimations.

The UE 120 is able to evaluate among different parameters based on what received from the network node 110, 130 and its own setup and measurements to compute the integrity level of the position estimation.

The UE 120 may discriminate some problematic measurements or computations based on the assisted information received from the network in terms of integrity.

The UE 120 may repeat some measurements in order to improve the integrity level of the positioning performance.

The UE 120 may have certain rules for hybrid positioning depending on the integrity conditions. Hybrid positioning when used herein means that two or more positioning methods are considered for the final positioning computation.

Figure 5:
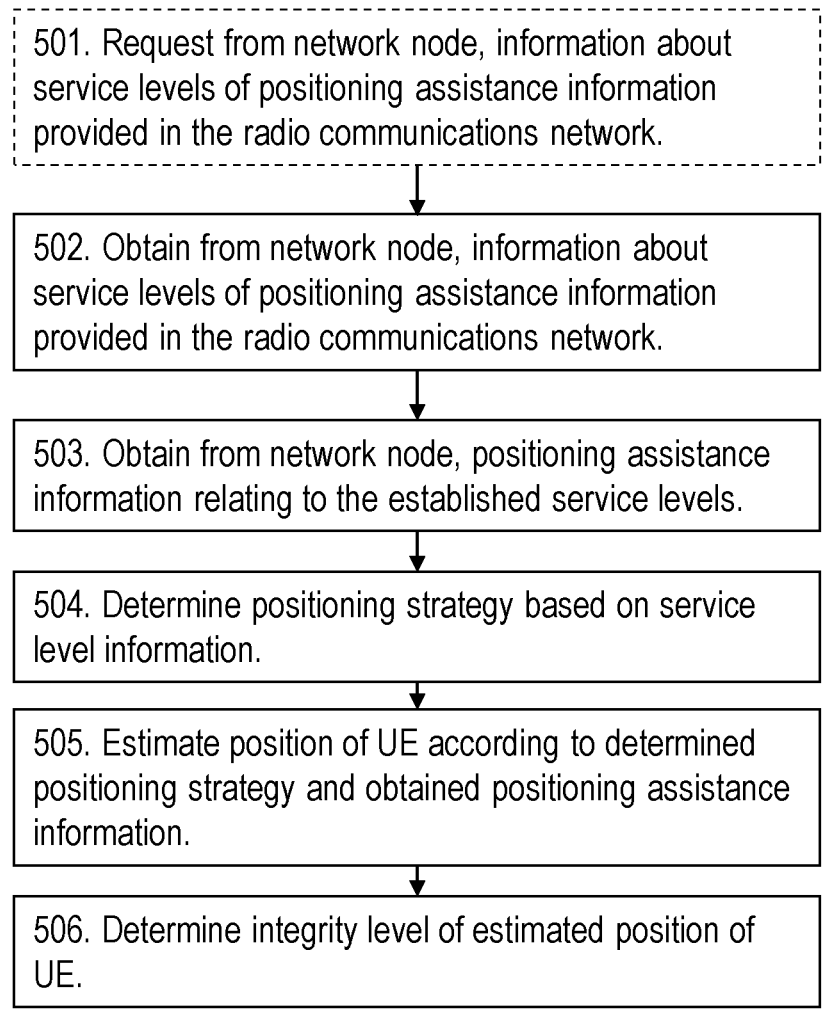
FIG. 5 is a flowchart depicting embodiments of a method in a UE.

FIG. 5 shows an example method performed by the UE 120, e.g. for determining an integrity level of an estimated position of the UE 120 in a radio communications network 100.

In some embodiments proved herein the UE 120 may determine a positioning strategy based on information about the service levels received from the network node 110, 130. The UE 120 will then estimate the position of the UE 120 according to the determined positioning strategy and based on positioning assistance information obtained from the network node 110, 130, determine an integrity level of the estimated position of the UE 120.

The method comprises any one or more out of the actions below:

Action 501

The UE 120 may request from network node 110, 130, information about service levels of positioning assistance information provided in the radio communications network 100. This may e.g. in cases such as the UE 120 is categorized as highly reliable device and needs further assistance from the network on its positioning measurement and estimation quality.

Action 502

The UE 120 obtains information from the network node 110, 130 operating in the radio communications network 100. The information is about service levels of positioning assistance information provided in the radio communications network 100. The service levels are related to any one or more out of Integrity (I) Availability (A) and Continuity (C), (I-A-C). This obtained information about the service levels of positioning assistance information provided in the radio communications network 100 will help the UE 120 to assess the quality of the positioning assistance information and the level of positioning service support from the network at the covered area which the device is located.

The service levels may e.g. be based on any one or more out of: environmental aspects, network aspects, and service aspects.

Environmental aspects when used herein e.g. means all parameters such as weather and atmospheric conditions, the distribution of any object creating multipath environment such as buildings, trees, etc.

Network aspects when used herein e.g. means aspects in terms of network deployment in the area, the spectrum, bandwidth, coverage, and capacity of the network in that area.

Service aspects when used herein e.g. means the network and other RAT-independent technology support in terms of positioning services that are available in the area.

Action 503

The UE 120 obtains positioning assistance information from the network node 110, 130. The positioning assistance information relates to established service levels. The service levels are e.g. established by the network node 110, 130. This will be useful for the UE 120 to analyze and assess the network and service level quality support which is received from the positioning assistance information in order to evaluate the integrity and reliability level of its positioning measurements and estimations.

In some embodiments, the positioning assistance information comprises one or more integrity Key Performance Indicators (KPIs). This is advantageous since it provides the UE 120 with a direct assessment of the network in terms of the sent positioning assistance information.

Thus, the positioning assistance information may comprise one or more positioning integrity KPIs. While protection level is also considered as one KPI, it is more an integrity KPI which is communicated back from the UE 120, as the UE 120 has a better understanding of this KPI at its location. However, the radio communications network 100 may still be capable of providing an estimation of even the protection level KPI in the positioning assistance information.

Action 504

The UE 120 determines a positioning strategy based on the information about the service levels. The positioning strategy may e.g. be which positioning method to use e.g. among the RAT-based and RAT-independent positioning methods how to prioritize in terms of picking one method or weighting two or more methods depending on the service level received.

In some embodiments, the positioning strategy based on the information about the service levels, is performed based on an evaluation of a positioning procedural decision that in turn is based on the information about the service levels. This means that the UE 120 actions may comprise:

Identifying the required number of measurements, e.g. how many cells and/or TRPs and/or beams etc., and which measurements UE Rx-TX, TDOA, PRS, RSRP, and associated quality and/or uncertainty for the measurements for a 25 Integrity level.

Mapping the results and uncertainty and/or quality values into different Integrity level.

Based upon that; i.e. if desired integrity level is not met then:

Performing additional measurements,

Triggering the request for additional measurements 30

Repeating the measurements.

Action 505

The UE 120 estimates the position of the UE 120 according to the determined positioning strategy. The estimation of the position of the UE 120 is based on the obtained positioning assistance information.

As mentioned above, in some embodiments, the obtained positioning assistance information may comprise one or more integrity KPIs. In these embodiments the estimation of the position of the UE 120 is accordingly based on the obtained positioning assistance information comprising the one or more integrity KPIs. This e.g. means that the one or more integrity KPIs will be used as contributing factors in the estimation of the position or the integrity level estimation of the UE 120 according to the determined positioning strategy.

Action 506

The UE 120 then determines an integrity level of the estimated position of the UE 120. E.g. the integrity level associated with the UE 120 positioning estimation. The determined integrity level may be used by the UE 120 for operational tasks. Examples of operational tasks that UE 120 is enabled to perform based on the determined integrity level will be discussed below.

Figure 6:
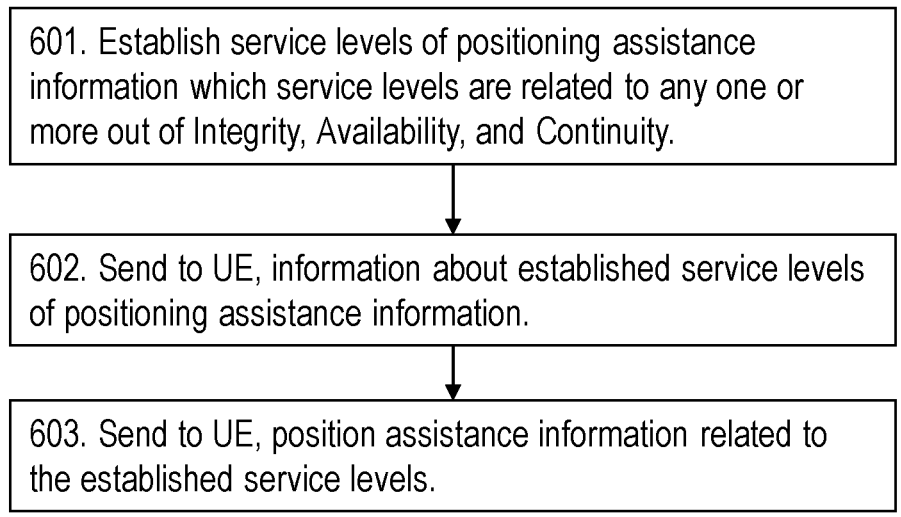
FIG. 6 is a flowchart depicting embodiments of a method in a network node.

FIG. 6 shows an example method performed by the network node 110, 130, e.g. for assisting the UE 120 in determining an integrity level of an estimated position of the UE 120 in the radio communications network 100.

In some embodiments, the network node 110, 130 is represented by any one out of: the radio network node 110 and the location server node 130.

The method comprises any one or more out of the actions below:

Action 601

The network node 110, 130 establishes service levels of positioning assistance information provided in the radio communications network 100. The service levels are related to any one or more out of Integrity (I), Availability (A), and Continuity (C), (I-A-C). This may be performed by one or more nodes within the network including the location server 130 and shared to be included in the positioning assistance information from the location server 130.

The positioning assistance information may comprise one or more integrity KPIs.

In some embodiments the service levels are established based on any one or more out of: environmental aspects, network aspects, and service aspects.

The network node 110, 130 assists the UE 120 in determining an integrity level of an estimated position of the UE 120 by performing e.g. actions 602 and 603 below:

Action 602

The network node 110, 130 sends information to the UE 120. The information is about the established service levels of the positioning assistance information.

Action 603

The network node 110, 130 further sends positioning assistance information to the UE 120. The positioning assistance information relates to the established service levels.

The performed actions 602 and 603 enables the UE 120 to determine a positioning strategy based on the information about the service levels, estimate the position of the UE 120 according to the determined positioning strategy and based on the obtained positioning assistance information, and determine an integrity level of the estimated position of the UE 120.

In this way there is a systematic way to share the information between the network node 110, 130 and the UE 120 for a proper integrity and reliability analysis for the positioning estimation and have a more structured strategy on the positioning method selection.

The method will now be further explained and exemplified in below embodiments. These below embodiments may be combined with any suitable embodiment as described above.

FIGS. 7, 8 and 9 illustrate respective examples of methods according to embodiments herein. FIG. 7, as seen in perspectives from the location server node 130, FIG. 8, as seen in perspectives from radio network node 110, and FIG. 9 as seen in perspectives from the UE 120. The UE 120 is referred to as target device in the figures.

In some embodiments, the network node 110, 130 may, as mentioned above, obtain such as e.g. receive requests for any one or more of performance metrics: Integrity, Availability and Continuity (I-A-C), while it may report, one, two or all of them depending on its capabilities and potentials.

The UE 120 may receive the (I-A-C) of the positioning assistance information from the location server node 130 or from the radio network node 110 via unicast, or in the latter case via broadcast or multicast. In this case, the (I-A-C) service levels may be computed in the location server node 130, or in the radio network node 110 or partly within both network nodes and communicated among each other.

FIG. 7 discloses actions of an example of embodiments herein from the location server node 130 perspective.

The location server node 130 may e.g. receive 701 a request from the UE 120 such as the target device or the radio network node 110 on integrity, availability and continuity (I-A-C) service levels. This action relates to action 501 described above.

The location server node 130 establishes the service levels, such as e.g. determines 702 the (I-A-C) of the positioning assistance information based on environmental, network and service aspects. This action relates to action 601 described above.

The location server node 130 sends 703 the (I-A-C) information about the service levels to the UE 120 such as the target device via unicast or to the radio network node 110 for broadcast signaling. This action relates to action 602 described above.

FIG. 8 discloses actions of an example of embodiments herein from the radio network node 110 perspective.

The radio network node 110 may e.g. receives 801 a request from the UE 120 such as the target device, requesting (I-A-C) service levels. This action relates to action 501 described above.

The radio network node 110 may e.g. send 802 a request to the location server node 130, requesting (I-A-C) service levels.

The radio network node 110 establishes such as determines 803 the (I-A-C) of the positioning assistance information based on environmental, network and service aspects. This action relates to action 601 described above.

The radio network node 110 sends 804 the (I-A-C) information about service levels to the UE 120, such as the target device, via broadcast signaling. This action relates to action 602 described above.

FIG. 9 discloses actions of an example of embodiments herein from the UE 120 perspective.

The UE 120 may e.g. receive 901 a positioning request with integrity support from the network node 110, 130 or another unit.

The UE 120 may send 902 a request for (I-A-C) service levels to the network node 110, 130. This action relates to action 501 described above.

The UE 120 obtains, such as e.g. receives 903 (I-A-C) information about service levels from the network node 110, 130 either via broadcast or unicast. This action relates to actions 502 and 602 described above.

The UE 120 determines 904 positioning strategy, also referred to as positioning solution strategy, based on the received (I-A-C) service levels. This action relates to action 504 described above.

The UE 120 estimates 905 the position based on the determined positioning strategy. This action relates to action 505 described above.

The UE 120 determines, such as e.g. estimates 906 the integrity level of the positioning estimation. This action relates to action 506 described above.

The UE 120 may then send 907 the positioning estimation together with the integrity level to the network node 110, 130 or another unit who sent the request.

In order for the UE 120 and the network such as the radio access network node 110 or the location server node 130 to assess the integrity of the positioning estimation, first of all, they may preferably have the same definitions and rules of how to set their integrity KPIs, see e.g. some non-limiting examples above, and preferably also to transfer this knowledge and the related parameters in a most optimum way.

Methods to Determine the Integrity Level According to Embodiments Herein

The integrity level may be e.g. a target integrity level, an estimated achievable or predicted or expected integrity level, or achieved integrity level.

The integrity level may be determined, e.g., based on one or more pre-defined rules, tables, logical expression or mathematical or statistical function F(P) of one or more parameters P, or a calculation performed by the UE 120. The parameter P may be a wide range of parameters e.g. comprising weather condition, speed of the UE, mobility behavior of the UE, capacity condition of the network, etc.

In one simple example the following integrity levels are defined for an overall positioning system comprised in the radio communications network 100, including both the UE 120 and the network node 110, 130. Depending on the purpose and the node, the levels may be determined: Before such as e.g., the requested or a predicted integrity level or promised/available integrity level, during such as e.g., the currently perceived or achieved integrity level or its estimate based on the progress so far, or after such as e.g., the actually perceived integrity level) positioning measurements and/or position calculation. The network node 110, 130 and the UE 120 may support the operation at all or a subset of levels, which may also be a part of their respective capabilities. Examples of integrity levels may e.g. be defined as follows:

No integrity: It may mean that the positioning system has no means to assess the integrity level of the positioning estimation. As there is no systematic way, there is no way to justify the reliability and/or timeliness (actuality) of the obtained position estimation from the UE or the network.

Low integrity: It may mean that the integrity KPIs and thresholds are defined; however, the AL and PL are set so high that the positioning system rarely has any issue with unavailability or misleading operation. The position error may also be quite high while both the network node 110, 130 and the UE 120 are not alerted about it.

Medium integrity: It may mean that the integrity KPIs and thresholds are defined, and the AL and PL are set such that sometimes the system may provide failure errors due to unavailability of proper position estimation, or notifying on the potential of misleading information, etc.

High integrity: It may mean that the integrity KPIs and thresholds are defined, and the AL and PL are set such tight that unless the positioning error is below some small amount, the positioning system would not accept the performance and there may be a need to repeat the measurement or add extra positioning technique to improve the position estimation. So as long as the positioning system reports a position estimation, it is quite highly guaranteed that it is a very reliable value.

I-A-C Service Level According to Embodiments Herein

The service levels are related to any one or more out of Integrity (I) Availability (A), and Continuity (C), and they are in the below examples referred to as the I-A-C service level.

The I-A-C service level may not only comprise the network's integrity level but may also comprise the availability of that integrity level and the continuity of that integrity level in both time and space. These parameters may depend and set by the radio communications network 100 such as e.g. the network node 110, 130, based on factors such as the positioning use-case, the radio quality of the radio communications network 100, the weather condition in that part of the radio communications network 100, the reported performance quality of previous UEs in similar condition, etc.

The I-A-C service level may be set by the network and sent to the UE 120 so that the UE 120 can determine its integrity level, based on what could be expected and the quality of the assistance information received from the radio communications network 100. The I-A-C service level sent by the network node 110, 130 is the enabler for the integrity level determining in the UE 120.

The I-A-C service level may be reported separately for each positioning assistance information or an aggregated value for the overall set of the assistance information for that particular positioning method. For example, in the downlink Time Difference of Arrival (TDOA) positioning method, the I-A-C level may be reported by the network node 110, 130 for the assistance information of each Positioning Reference Signal (PRS) separately, or one set of value may be reported by the network node 110, 130 for all provided PRS set in the assistance information.

The I-A-C service level may be reported e.g. in terms of percentage value, validity time, and coverage area. The network node 110, 130 may report all I-A-C, I-A, I-C or only I service level to the UE 120.

In one simple indication of availability, a muting scheme may be assumed, where the network node 110, 130 initiates a scheme on how and when the positioning reference signals are being transmitted and therefore, when a signal may be available or not. While i in a more advanced radio communications network 100, this value may provide the availability of the signal when it is actually assumed to be transmitted. This value may be very high for example 99% of the time, however, for highly reliable use-cases, even a slight availability issue may cause problematic situation and hence the network node 110, 130 may provide its own assessment on this parameter.

The I-A-C level reported by the network node 110, 130 may further comprise any one or more of:

An indication of a type of failure (if any) which impacts the I-A-C level.

Completeness and/or detail level of the current positioning assistance information.

An indication of the possibility to obtain assistance data associated with a higher I-A-C level.

A timeliness and/or actuality of the provided assistance data, measurements, or position estimate.

Positioning Solution Strategy According to Embodiments Herein

When the UE 120 obtains 502 such as e.g. receives the I-A-C service level, then it may determine 504 such as e.g. decide on what positioning solution strategy, also referred to as positioning strategy, to follow. The Positioning Solution Strategy at the target device may comprise:

A selection of which positioning method to choose based on the reported I-A-C level from the network node 110, 130.

Avoiding certain positioning methods due to reported failure, for example at some certain environmental failures, the GNSS method or IMU sensors may have large errors.

Building a knowledge database and algorithms which may be pre-configured or it may be built or updated dynamically, based on inputs from different nodes such as the UE 120 and/or the network node 110, 130.

In one further example, the UE 120 may provide its estimated position and the associated integrity KPI (s); the integrity system may use these inputs to update its knowledge database. This information may further be used e.g. for positioning other UEs or configuring the positioning for other UEs.

In another example, the network node 110, 130 e.g., the radio network node 110, may provide its one or more configurations for positioning and the associated integrity KPI. This input may be further used by the integrity system to select the necessary configuration for positioning UE 120 with a given integrity level.

Examples Embodiments of UE 120 Operational Tasks Using the Determined Integrity Level In some examples, the computed integrity level may be further used by the UE 120 for one or more operational tasks, e.g.:

Indicating the determined integrity level determined by the UE 120 to another UE or a network node, e.g., the radio network node 110, the location server node 130 or a positioning node.

Selecting a positioning solution strategy e.g. a positioning method and/or one or more types of positioning measurements for positioning the UE 120, based at least on the determined integrity level.

Determining or selecting configuration of signals, based on the determined integrity level, needed for positioning measurements.

Determining UE 120 location, based at least on the determined integrity level, e.g., resulting in a first UE location result when the determined integrity level is below a threshold, and resulting in a second UE location result otherwise.

Performing positioning measurements, adaptively to the determined integrity level, e.g., faster and/or more accurate measurements may be performed for a higher target integrity level.

Using positioning measurements or positioning results, adaptively to the determined associated integrity level. E.g., more limited usage if integrity level is below a threshold, allowing for usage by a specific application if the integrity level is above a threshold, etc.

Selecting a first positioning measurement report mapping when the determined integrity threshold is below a threshold, otherwise selecting a second positioning measurement report mapping, more accurate reporting or higher granularity reporting.

Selecting a first reporting resolution (lower resolution) for the positioning result when the determined integrity level is below a threshold and selecting a second reporting resolution (higher resolution) when it is above a threshold.

Examples of UE 120 Additional Actions to Ensure Positioning Integrity for the UE 120

The UE 120 may determine a required number of measurements and the associated quality and/or uncertainty that is needed to meet a certain positioning integrity. For example, for multi-Round Trip Time (RTT), the UE 120 may be required to perform measurements for a serving cell and two neighbor cells. For, UE based multi-RTT, network node 110, 130 such as e.g. a gNB or LMF, may report the gNB Rx Tx measurements to the UE 120.

The UE 120 may request for additional measurements to be performed by other radio network nodes, such as gNBs and/or TRPs, if the results obtained from current gNBs/TRPs provide large uncertainty or cannot meet the integrity requirements.

In such cases, the UE 120 may send an Integrity Risk and/or Failure message to the network node 110, 130 such as e.g. the LMF, using LPP saying additional measurements are required. The network node 110, 130 such as e.g. the LMF may select some other neighbor radio network nodes such as e.g. gNBs, to perform the measurements. The UE 120 may further point to which TRPs Rx-Tx are additionally required.

Another example for DL-OTDOA; if the UE 120 has difficulty in identifying the outliers during the timing measurements; it may repeat the measurements or ask the network node 110, 130 such as e.g. the LMF to provide better expected RSTD window so that the outliers can be removed and/or minimized or to provide another set of AD for measurements. In another situation, the UE 120 may estimate its position using DL OTDOA measurements. Depending on the geometry of the network node 110, 130 transmitting PRS the uncertainty in positioning estimate may be determined by the UE 120. The UE 120, provided that the position integrity is below a certain threshold, may then request transmission of PRS with a specific configuration. The PRS configuration in this case may comprise bandwidth, spectral region where PRS reception is better, and the gNBs/TRPs that result into lower Geometric Dilution of Precision (GDOP).

The UE 120 Actions may Comprise:

Identifying the required number of measurements, e.g. how many cells and/or TRPs and/or beams etc., and which measurements UE Rx-TX, TDOA, PRS-RSRP, and associated quality and/or uncertainty for the measurements for an Integrity level.

Mapping the results and uncertainty and/or quality values into different Integrity level. Based upon that; i.e. if desired integrity level is not met then:

Performing Additional Measurements

Triggering the request for additional measurements

Repeating the measurements

Figure 10A:
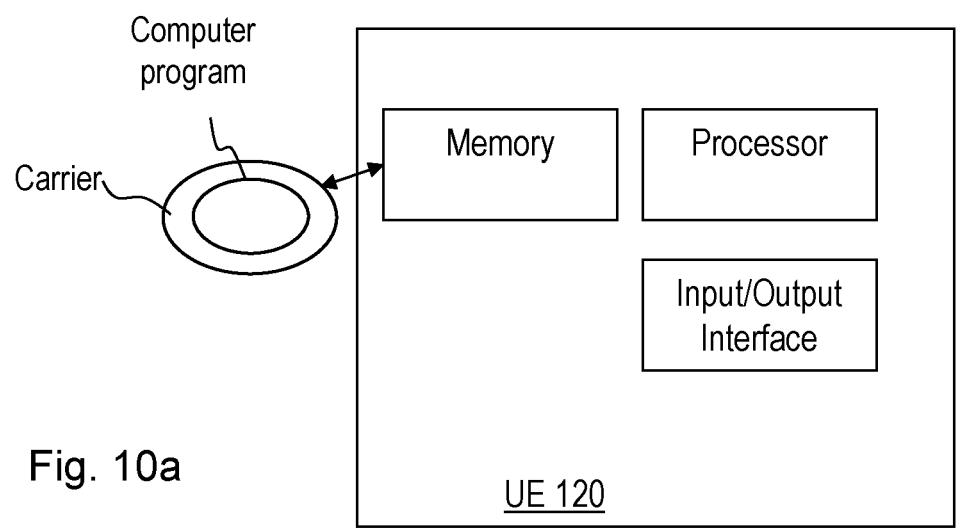
FIGS. 10 *a* and *b* are schematic block diagrams illustrating embodiments of a UE.
Figure 10B:
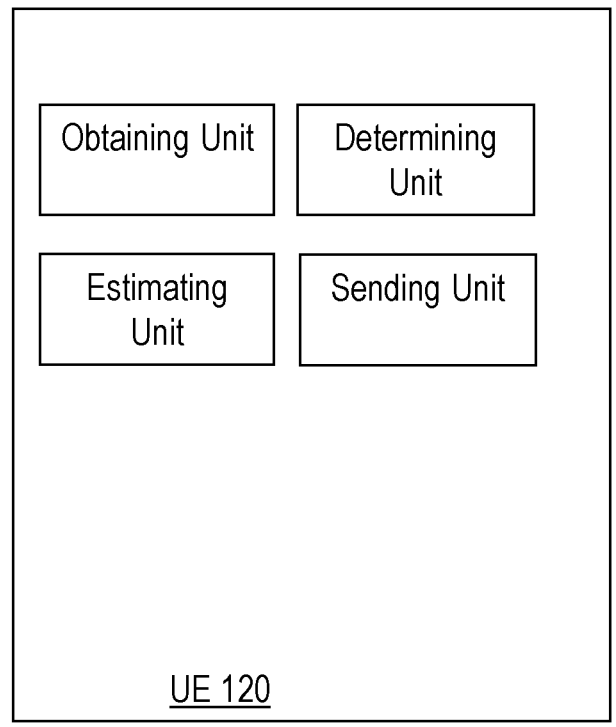

FIGS. 10*a* and 10*b* shows an example of arrangement in the UE 120.

Figure 11A:
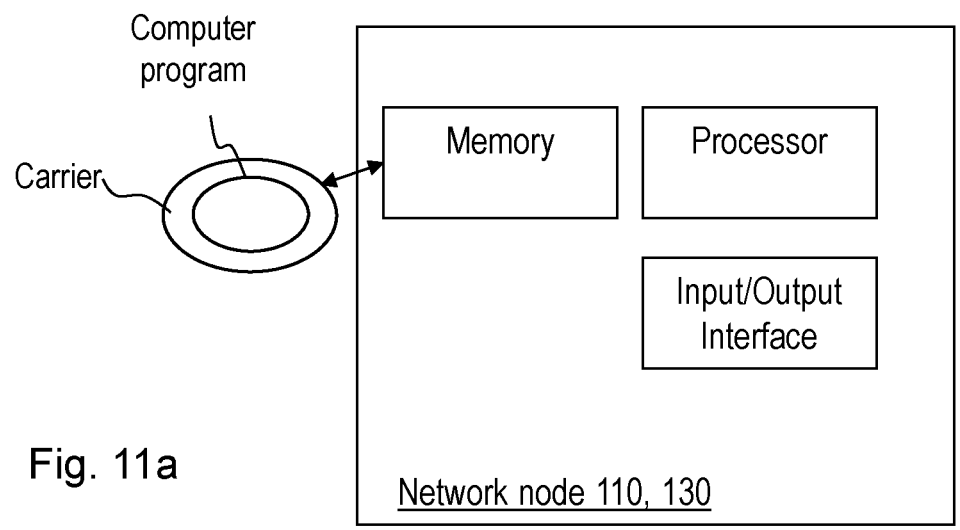
FIGS. 11 *a* and *b* are schematic block diagrams illustrating embodiments of a network node.
Figure 11B:
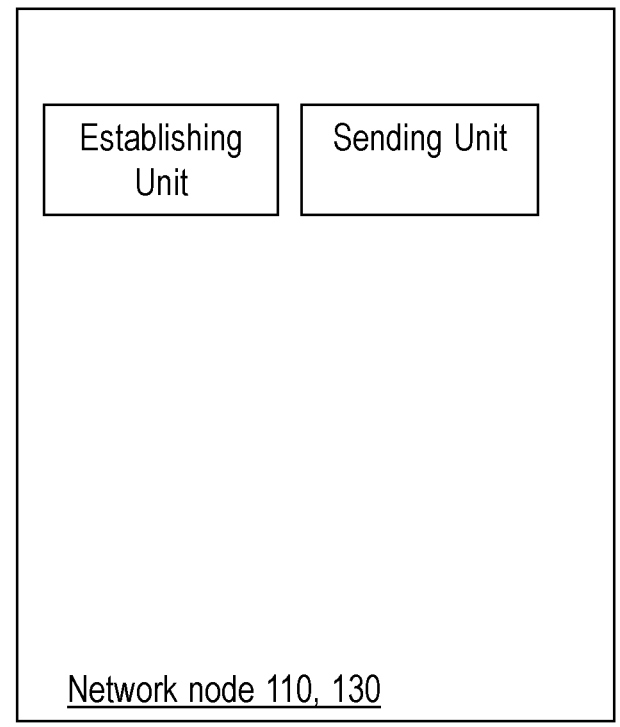

FIGS. 11*a* and 11*b* shows an example of arrangements in the network node 110, 130.

The UE 120 and network node 110, 130 may comprise a respective an input and output interface configured to communicate with each other. The respective input and output interface may comprise a wireless receiver (not shown) and a wireless transmitter (not shown).

The UE 120 may comprise an obtaining unit, a determining unit, an estimating unit, a sending unit to perform the method actions as described herein. See FIG. 10*b*.

The network node 110, 130 may comprise an establishing unit, a sending unit, to perform the method actions as described herein. See FIG. 10*b*.

The embodiments herein may be implemented through a respective processor or respective one or more processors, such as the processor of a processing circuitry in the UE 120 depicted in FIG. 10*a* and the network node 110,130 depicted in FIG. 11*a*, together with a respective computer program code for performing the respective functions and actions of the embodiments herein. The respective program code mentioned above may also be provided as a computer program product, for instance in the form of a data carrier carrying the respective computer program code for performing the embodiments herein when being loaded into the respective UE 120 and network node 110, 130. The respective carrier may be in the form of a CD ROM disc. It is however feasible with other data carriers such as a memory stick. The computer program code may furthermore be provided as pure program code on a server and downloaded to the respective UE 120 and network node 110, 130.

The UE 120 and network node 110, 130 may further comprise a respective memory comprising one or more memory units. The respective memory comprises instructions executable by the processor in the respective UE 120 and network node 110, 130. The respective memory is arranged to be used to store positioning assistance information, positioning strategy, estimated position of the UE 120, integrity level, information about service levels, instructions, data, configurations, and applications to perform the respective methods herein when being executed in the respective UE 120 and network node 110, 130.

In some embodiments, a respective computer program comprises instructions, which when executed by the at least one processor, cause the at least one processor of the respective UE 120 and network node 110, 130 to perform the actions above.

In some embodiments, a respective carrier comprises the respective computer program, wherein the respective carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the respective UE 120 and network node 110, 130, described below may refer to a combination of analog and digital circuits, and/or one or more processors configured with software and/or firmware, e.g. stored in the respective UE 120 and network node 110, 130, that when executed by the one or more processors such as the respective processors described above, cause the respective at least one processor to perform actions according to any of the actions above. One or more of these respective processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-20 are shortly described. See e.g. FIGS. 4, 5, 6, 10*a*, 10*b*, 11*a* and 11*b*.

Embodiment 1. A method performed by a User Equipment, UE, 120, e.g. for determining an integrity level of an estimated position of the UE 120 in a radio communications network 100, the method comprising any one or more out of:
 obtaining 502 information from a network node 110, 130 operating in the radio communications network 100, which information is about service levels of positioning assistance information provided in the radio communications network 100, which service levels are related to any one or more out of Integrity, I, Availability, A, and Continuity, C, I-A-C,
 obtaining 503 from the network node 110, 130, positioning assistance information relating to the established service levels,
 determining 504 a positioning strategy based on the information about the service levels,
 estimating 505 the position of the UE 120 according to the determined positioning strategy, and based on the obtained positioning assistance information, and
 determining 506 an integrity level of the estimated position of the UE 120.

Embodiment 2. The method according to embodiment 1, wherein determining 504 a positioning strategy based on the information about the service levels, is performed based on an evaluation of a positioning procedural decision based on the information about the service levels.

Embodiment 3. The method according to any of the embodiments 1-2, wherein the positioning assistance information comprises one or more integrity Key Performance Indicators, KPIs.

Embodiment 4. The method according to any of the embodiments 1-3, wherein the service levels e.g. are based on any one or more out of: environmental aspects, network aspects, and service aspects.

Embodiment 5. A computer program comprising instructions, which when executed by a processor, causes the processor to perform actions according to any of the embodiments 1-4.

Embodiment 6. A carrier comprising the computer program of embodiment 5, wherein the carrier is one of an electronic signal, an optical signal, an electromagnetic signal, a magnetic signal, an electric signal, a radio signal, a microwave signal, or a computer-readable storage medium.

Embodiment 7. A method performed by a network node 110, 130 e.g. for assisting a User Equipment, UE, 120 in determining an integrity level of an estimated position of the UE 120 in a radio communications network 100, the method comprising any one or more out of:
 establishing 601 service levels of positioning assistance information provided in the radio communications network 100, which service levels are related to any one or more out of Integrity, I, Availability, A, and Continuity, C, I-A-C,
 assisting the UE 120 in determining an integrity level of an estimated position of the UE 120 by:
 sending 602 information to the UE 120, which information is about the established service levels of positioning assistance information, and
 sending 603 to the UE 120, positioning assistance information relating to the established service levels,
 enabling the UE 120 to determine a positioning strategy based on the information about the service levels, and estimate the position of the UE 120 according to the determined positioning strategy, and based on the obtained positioning assistance information, and determine an integrity level of the estimated position of the UE 120.

Embodiment 8. The method according to embodiment 7, wherein the positioning assistance information comprises one or more integrity Key Performance Indicators, KPIs.

Embodiment 9. The method according to any of the embodiments 7-8, wherein the service levels are established based on any one or more out of: environmental aspects, network aspects, and service aspects.

Embodiment 10. The method according to any of the embodiments 7-9, wherein the network node 110, 130 is represented by any one out of: a radio network node 110 and a location server node 130.

Embodiment 11. A computer program comprising instructions, which when executed by a processor, causes the processor to perform actions according to any of the embodiments 7-10.

Embodiment 12. A carrier comprising the computer program of embodiment 11, wherein the carrier is one of an electronic signal, an optical signal, an electromagnetic signal, a magnetic signal, an electric signal, a radio signal, a microwave signal, or a computer-readable storage medium.

Embodiment 13. A User Equipment, UE, 120, e.g. configured to determine an integrity level of an estimated position of the UE 120 in a radio communications network 100, the UE 120 further being configured to any one or more out of:
 obtain information from a network node 110, 130 operating in the radio communications network 100, which information is adapted to be about service levels of positioning assistance information provided in the radio communications network 100, which service levels are adapted to be related to any one or more out of Integrity, I, Availability, A, and Continuity, C, I-A-C, e.g. by means of an obtaining unit in the UE 120, obtain from the network node 110, 130, positioning assistance information relating to the established service levels, e.g. by means of the obtaining unit in the UE 120, determine a positioning strategy based on the information about the service levels, e.g. by means of a determining unit in the UE 120, estimate the position of the UE 120 according to the determined positioning strategy, and based on the obtained positioning assistance information, e.g. by means of an estimating unit in the UE 120, and determine an integrity level of the estimated position of the UE 120, e.g. by means of the determining unit in the UE 120.

Embodiment 14. The UE 120 according to embodiment 13, further being configured to determine a positioning strategy based on the information about the service levels, e.g. by means of the determining unit in the UE 120, further based on an evaluation of a positioning procedural decision based on the information about the service levels.

Embodiment 15. The UE 120 according to any of the embodiments 13-14, wherein the positioning assistance information is adapted to comprise one or more integrity Key Performance Indicators, KPIs.

Embodiment 16. The UE 120 according to any of the embodiments 13-15, wherein the service levels e.g. are adapted to be based on any one or more out of: environmental aspects, network aspects, and service aspects.

Embodiment 17. A network node 110, 130 e.g. configured to assist a User Equipment, UE, 120 in determining an integrity level of an estimated position of the UE 120 in a radio communications network 100, the network node 110, 130 further being configured to any one or more out of:

establish service levels of positioning assistance information provided in the radio communications network 100, which service levels are adapted to be related to any one or more out of Integrity, I, Availability, A, and Continuity, C, I-A-C, e.g. by means of an establishing unit in the network node 110,130, assist the UE 120 in determining an integrity level of an estimated position of the UE 120 by:

sending information to the UE 120, e.g. by means of a sending unit in the network node 110,130, which information is adapted to be about the established service levels of positioning assistance information, and sending to the UE 120, e.g. by means of the sending unit in the network node 110,130, positioning assistance information relating to the established service levels, enabling the UE 120 to determine a positioning strategy based on the information about the service levels, and estimate the position of the UE 120 according to the determined positioning strategy and based on the obtained positioning assistance information, and determine an integrity level of the estimated position of the UE 120.

Embodiment 18. The network node 110, 130 according to embodiment 17, wherein the positioning assistance information is adapted to be one or more integrity Key Performance Indicators, KPIs.

Embodiment 19. The network node 110, 130 according to any of the embodiments 17-18, wherein the service levels are adapted to be established based on any one or more out of: environmental aspects, network aspects, and service aspects, e.g. by means of the establishing unit in the network node 110,130.

Embodiment 20. The network node 110, 130 according to any of the embodiments 17-19, wherein the network node 110, 130 is represented by any one out of: a radio network node 110 and a location server node 130.

Further Extensions and Variations

Figure 12:
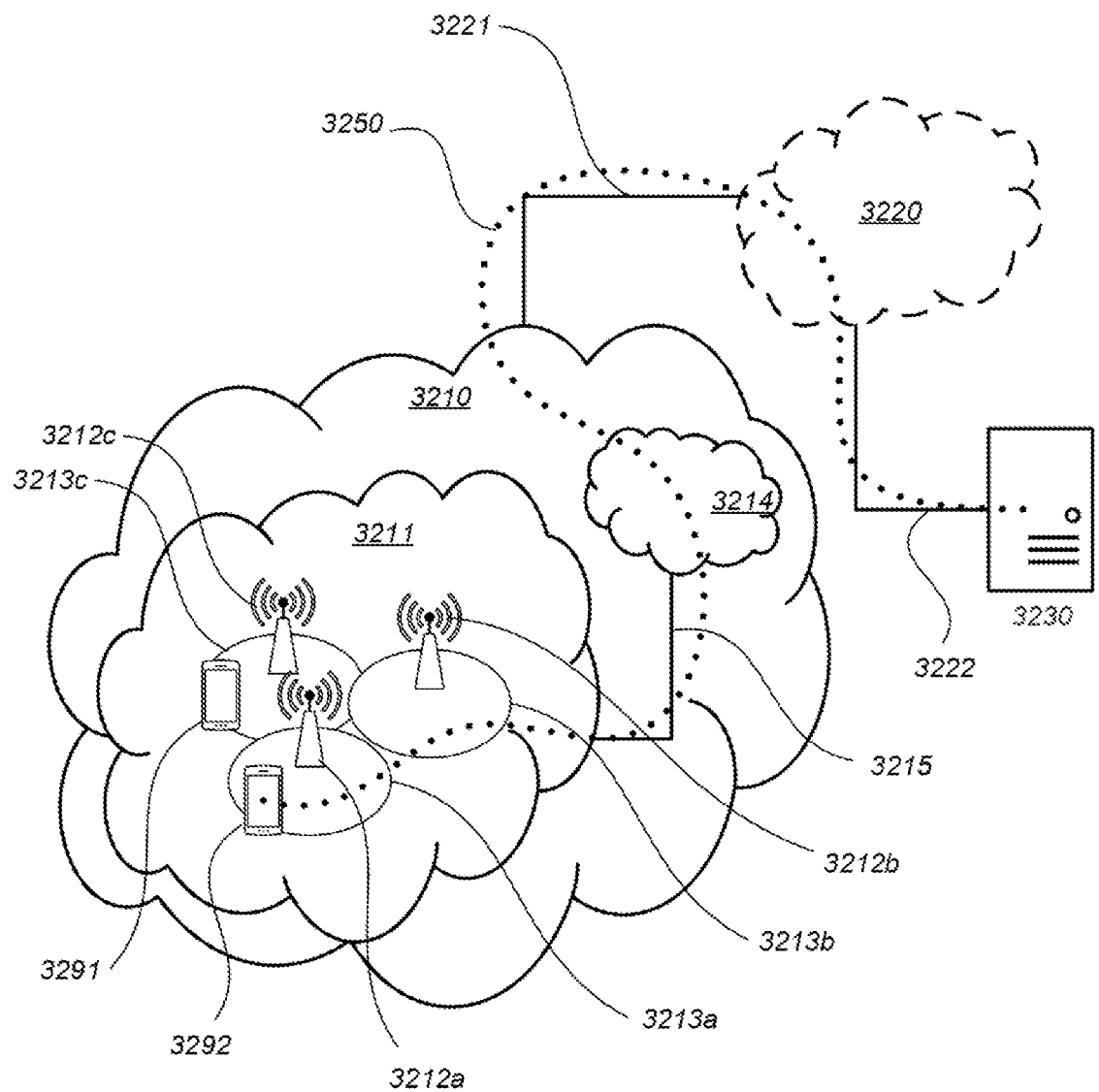
FIG. 12 schematically illustrates a telecommunication network connected via an intermediate network to a host computer.

With reference to FIG. 12, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, 130, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 120 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
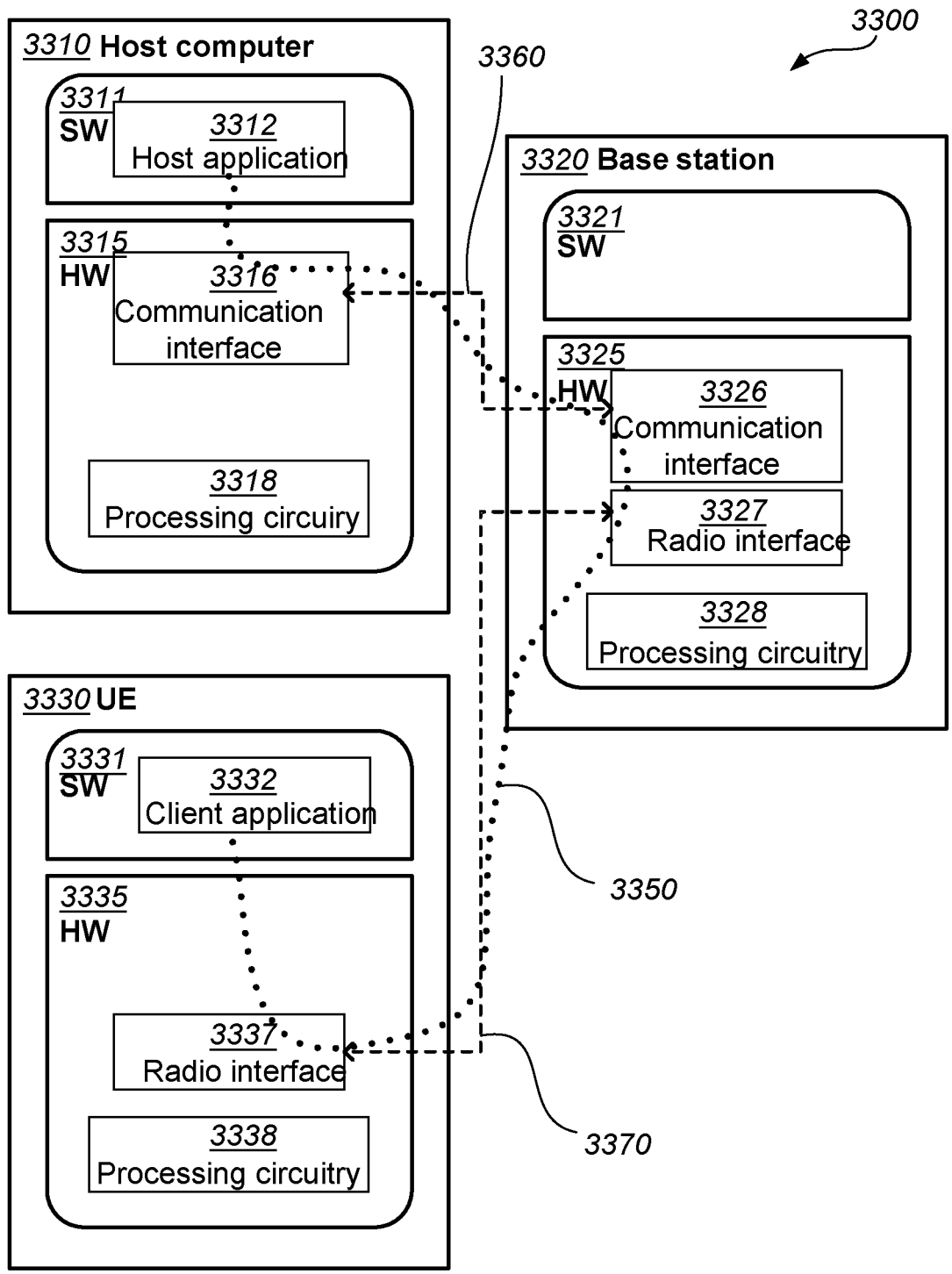
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 14, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station such as the network node 110, and a UE such as the UE 120, which may be those described with reference to FIG. 12 and FIG. 13. For simplicity of the present disclosure, only drawing references to FIG. 14 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 15 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 12 and FIG. 13. For simplicity of the present disclosure, only drawing references to FIG. 16 will be included in this section. In an optional first action 3610 of the method, the UE receives input data provided by the host computer. Additionally, or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 17 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a User Equipment (UE) for determining an integrity level of an estimated position of the UE in a radio communications network, the method comprising:
obtaining information from a network node operating in the radio communications network, which information is about service levels of positioning assistance information provided in the radio communications network, which service levels are related to any one or more out of Integrity (I), Availability (A), and Continuity (C);
obtaining from the network node, positioning assistance information relating to the service levels;
determining a positioning strategy based on the information about the service levels;
estimating a position of the UE according to the determined positioning strategy and based on the obtained positioning assistance information; and
determining an integrity level of the estimated position of the UE.

2. The method according to claim 1, wherein the determining the positioning strategy based on the information about the service levels is performed based on an evaluation of a positioning procedural decision based on the information about the service levels.

3. The method according to claim 1, wherein the positioning assistance information comprises one or more integrity Key Performance Indicators (KPIs).

4. The method according to claim 1, wherein the service levels are based on any one or more out of: environmental aspects, network aspects, and service aspects.

5. A non-transitory computer-readable storage medium comprising instructions which, when executed by a processor, cause a User Equipment (UE) to determine an integrity level of an estimated position of the UE in a radio communications network by performing operations comprising:
obtaining information from a network node operating in the radio communications network, which information is about service levels of positioning assistance information provided in the radio communications network, which service levels are related to any one or more out of Integrity (I), Availability (A), and Continuity (C);
obtaining from the network node, positioning assistance information relating to the service levels;
determining a positioning strategy based on the information about the service levels;
estimating a position of the UE according to the determined positioning strategy and based on the obtained positioning assistance information; and
determining an integrity level of the estimated position of the UE.

6. A method performed by a network node for assisting a User Equipment (UE) in determining an integrity level of an estimated position of the UE in a radio communications network, the method comprising:
establishing service levels of positioning assistance information provided in the radio communications network, which service levels are related to any one or more out of Integrity (I), Availability (A), and Continuity (C); and assisting the UE in determining an integrity level of an estimated position of the UE by:
sending information to the UE, which information is about established service levels of the positioning assistance information;
sending to the UE, positioning assistance information relating to the established service levels; and
enabling the UE to determine a positioning strategy based on the information about the service levels, estimate a position of the UE according to determined positioning strategy and based on the positioning assistance information, and determine an integrity level of the estimated position of the UE.

7. The method according to claim 6, wherein the positioning assistance information comprises one or more integrity Key Performance Indicators (KPIs).

8. The method according to claim 6, wherein the service levels are established based on any one or more out of: environmental aspects, network aspects, and service aspects.

9. The method according to claim 6, wherein the network node is represented by any one out of: a radio access node and a location server node.

10. A non-transitory computer-readable storage medium comprising instructions which, when executed by a processor, cause a network node for assisting a User Equipment (UE) in determining an integrity level of an estimated position of the UE in a radio communications network by performing operations comprising:
establishing service levels of positioning assistance information provided in the radio communications network, which service levels are related to any one or more out of Integrity (I), Availability (A), and Continuity (C); and
assisting the UE in determining an integrity level of an estimated position of the UE by:
sending information to the UE, which information is about established service levels of the positioning assistance information;
sending to the UE, positioning assistance information relating to the established service levels; and
enabling the UE to determine a positioning strategy based on the information about the service levels, estimate a position of the UE according to determined positioning strategy and based on the positioning assistance information, and determine an integrity level of the estimated position of the UE.

11. A User Equipment (UE) to determine an integrity level of an estimated position of the UE in a radio communications network, the UE comprising:
a processor; and
a memory comprising instructions which, when executed by the processor cause the UE to:
obtain information from a network node operating in the radio communications network, which information is about service levels of positioning assistance information provided in the radio communications network, which service levels are related to any one or more out of Integrity (I), Availability (A), and Continuity (C);
obtain from the network node, positioning assistance information relating to the service levels;
determine a positioning strategy based on the information about the service levels;
estimate a position of the UE according to the determined positioning strategy, and based on the obtained positioning assistance information; and
determine an integrity level of the estimated position of the UE.

12. The UE according to claim 11, further to determine a positioning strategy based on the information about the service levels, based on an evaluation of a positioning procedural decision based on the information about the service levels.

13. The UE according to claim 11, wherein the positioning assistance information is adapted to comprise one or more integrity Key Performance Indicators (KPIs).

14. The UE according to claim 11, wherein the service levels are adapted to be based on any one or more out of: environmental aspects, network aspects, and service aspects.

15. A network node to assist a User Equipment (UE) in determining an integrity level of an estimated position of the UE in a radio communications network, the network node comprising:
a processor; and
a memory comprising instructions which, when executed by the processor cause the network node to:
establish service levels of positioning assistance information provided in the radio communications network, which service levels are adapted to be related to any one or more out of Integrity (I), Availability (A), and Continuity (C); and
assist the UE in determining an integrity level of an estimated position of the UE by performing operations to:
send information to the UE, which information is about established service levels of the positioning assistance information;
send to the UE, positioning assistance information relating to the established service levels; and
enable the UE to determine a positioning strategy based on the information about the service levels, estimate a position of the UE according to determined positioning strategy and based on the positioning assistance information, and determine an integrity level of the estimated position of the UE.

16. The network node according to claim 15, wherein the positioning assistance information is one or more integrity Key Performance Indicators (KPIs).

17. The network node according to claim 15, wherein the service levels are established based on any one or more out of: environmental aspects, network aspects, and service aspects.

18. The network node according to claim 15, wherein the network node is represented by any one out of: a radio access node and a location server node.

* * * * *